US011038326B2

(12) United States Patent
McKenny

(10) Patent No.: US 11,038,326 B2
(45) Date of Patent: Jun. 15, 2021

(54) TEMPORARY PROTECTIVE COVER FOR JUNCTION BOXES

(71) Applicant: McKenny Klein Enterprises, LLC, Avon, CO (US)

(72) Inventor: Patrick Shannon McKenny, Avon, CO (US)

(73) Assignee: McKenny Klein Enterprises, LLC, Avon, CO (US)

(*) Notice: Subject to any disclaimer, the term of this patent is extended or adjusted under 35 U.S.C. 154(b) by 103 days.

(21) Appl. No.: 16/388,230

(22) Filed: Apr. 18, 2019

(65) Prior Publication Data

US 2019/0245335 A1 Aug. 8, 2019

Related U.S. Application Data

(63) Continuation-in-part of application No. 29/575,769, filed on Aug. 29, 2016, now Pat. No. Des. 848,379.

(60) Provisional application No. 62/754,802, filed on Nov. 2, 2018.

(51) Int. Cl.
*H02G 3/08* (2006.01)
*H02G 3/14* (2006.01)

(52) U.S. Cl.
CPC .............. *H02G 3/081* (2013.01); *H02G 3/14* (2013.01)

(58) Field of Classification Search
CPC ............ H02G 3/081; H02G 3/14; H02G 3/08; H02G 3/086
USPC ........................................... 220/302, 3.2, 3.8
See application file for complete search history.

(56) References Cited

U.S. PATENT DOCUMENTS

| 4,907,711 | A | 3/1990 | Stuchlik, III |
| 4,979,633 | A * | 12/1990 | Lakey .................. H02G 3/14 174/667 |
| 5,525,755 | A | 6/1996 | Christensen |
| 5,526,952 | A | 6/1996 | Green |
| 5,562,222 | A | 10/1996 | Jordan et al. |
| 5,639,991 | A * | 6/1997 | Schuette .............. H02G 3/12 174/58 |
| 5,710,392 | A | 1/1998 | Bordwell et al. |
| 6,166,329 | A | 12/2000 | Oliver et al. |
| 6,511,269 | B1 | 1/2003 | Smasne |
| 6,538,202 | B1 | 3/2003 | Shaffer et al. |
| 6,686,540 | B2 * | 2/2004 | Compagnone, Jr. ..... H02G 3/12 174/58 |
| 6,867,369 | B2 | 3/2005 | Wiggins |
| 6,906,260 | B2 | 6/2005 | Grendahl |
| 7,432,444 | B1 | 10/2008 | McCusker |
| 7,608,781 | B2 | 10/2009 | Compagnone, Jr. |
| 7,762,838 | B2 * | 7/2010 | Gorman ............... H01R 13/701 439/536 |

(Continued)

*Primary Examiner* — Rafael A Ortiz
(74) *Attorney, Agent, or Firm* — Endurance Law Group PLC

(57) ABSTRACT

A temporary protective cover for a junction box has a sheet-like rectangular body with cleats at top and bottom ends. The cleats are flange-like formations bent at preferably non-right angles designed to press against embossments inside the cavity of a junction box. One or both cleats may be fitted with a notch to facilitate overlapping placement to accommodate large-size junction boxes. A stop tab extends laterally outwardly from each cleat and serves to limit penetration of the covering into the cavity of a junction box. One or two small removal holes are located in the body of the cover, near to the cleats, to facilitate removal from a junction box.

17 Claims, 11 Drawing Sheets

(56) References Cited

U.S. PATENT DOCUMENTS

| | | | |
|---|---|---|---|
| 7,946,091 B1* | 5/2011 | Wisniewski | H02G 3/123 |
| | | | 52/741.1 |
| 8,110,742 B2 | 2/2012 | Compagnone, Jr. | |
| 8,119,911 B1 | 2/2012 | Waller | |
| 8,261,926 B2 | 9/2012 | Bradley et al. | |
| 2008/0236859 A1 | 10/2008 | de la Borbolla | |
| 2010/0155100 A1* | 6/2010 | Eastin | H02G 3/14 |
| | | | 174/66 |
| 2011/0056720 A1* | 3/2011 | Davidson | H02G 3/14 |
| | | | 174/53 |
| 2014/0034351 A1* | 2/2014 | Chang | H02G 3/10 |
| | | | 174/50 |
| 2014/0151203 A1* | 6/2014 | Gouhl | H01H 11/0006 |
| | | | 200/303 |
| 2014/0374412 A1* | 12/2014 | Rumsey | H02G 3/08 |
| | | | 220/3.8 |
| 2018/0012710 A1* | 1/2018 | Lark, Jr. | H01H 9/54 |

* cited by examiner

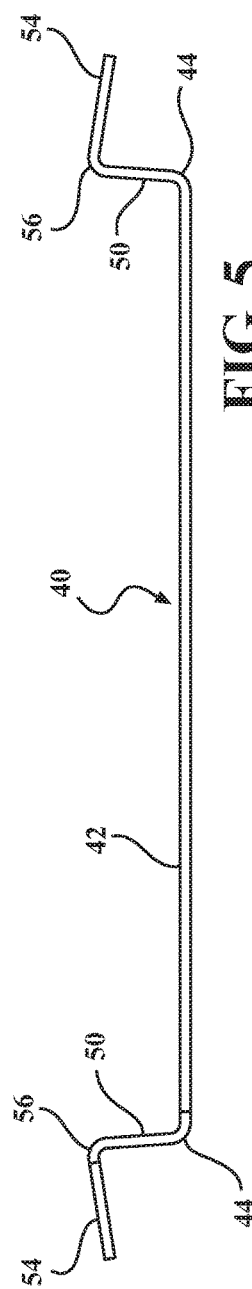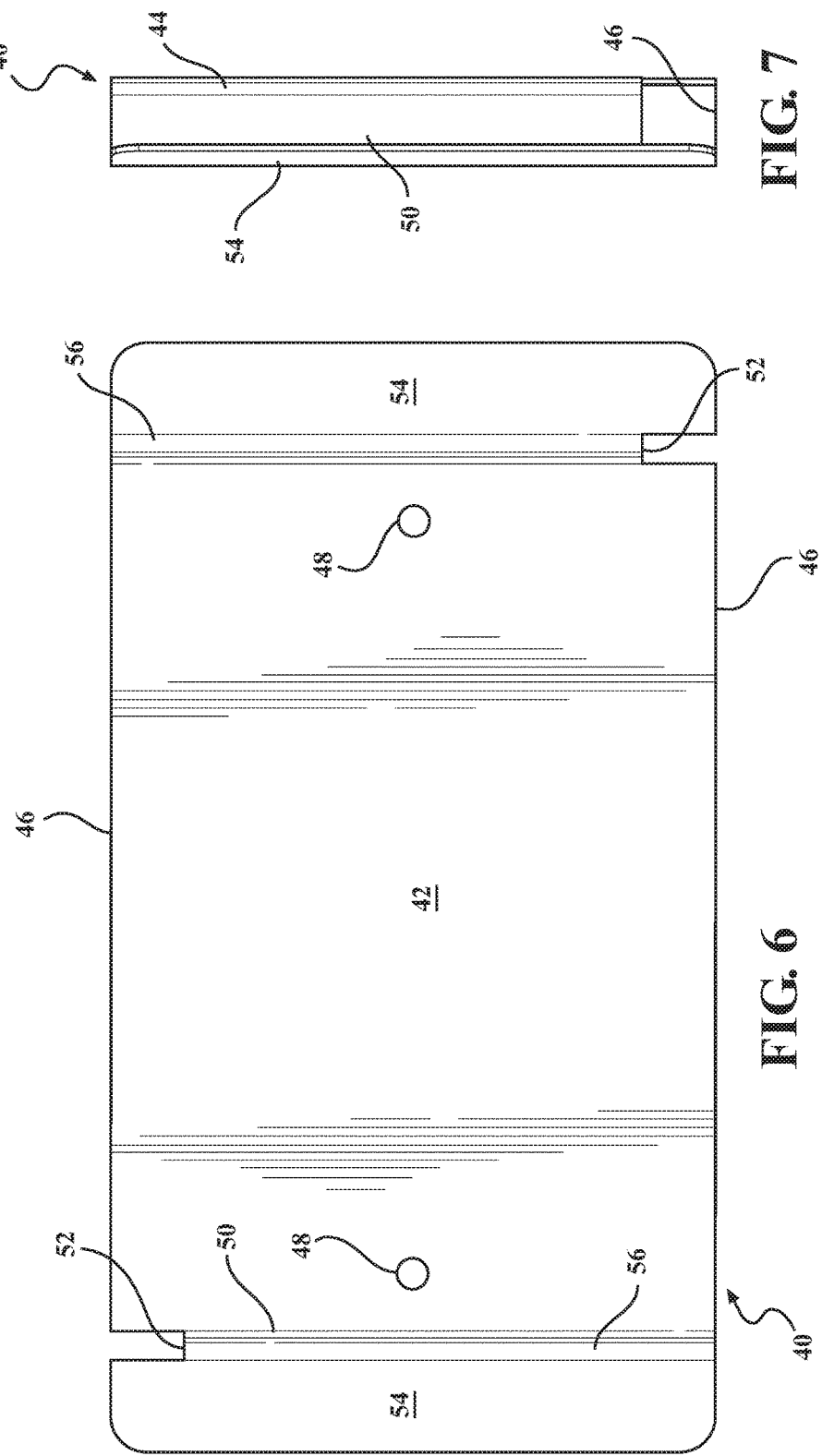

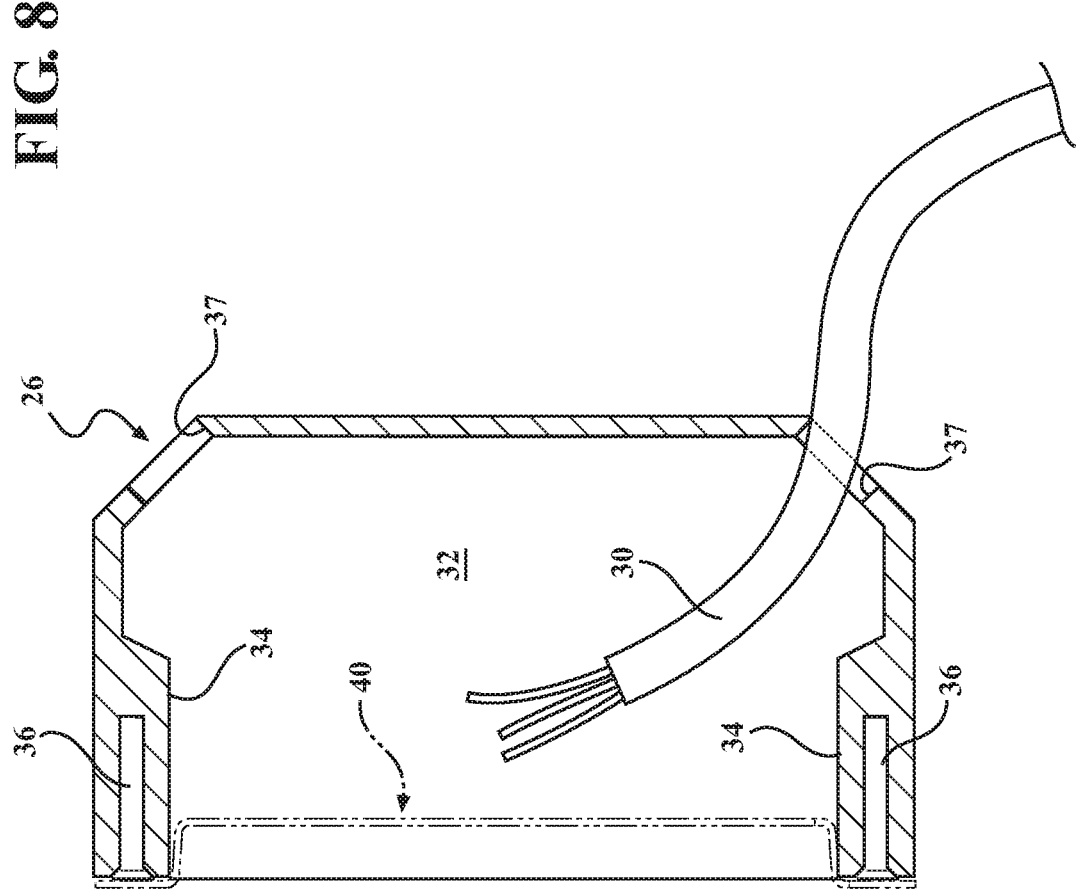
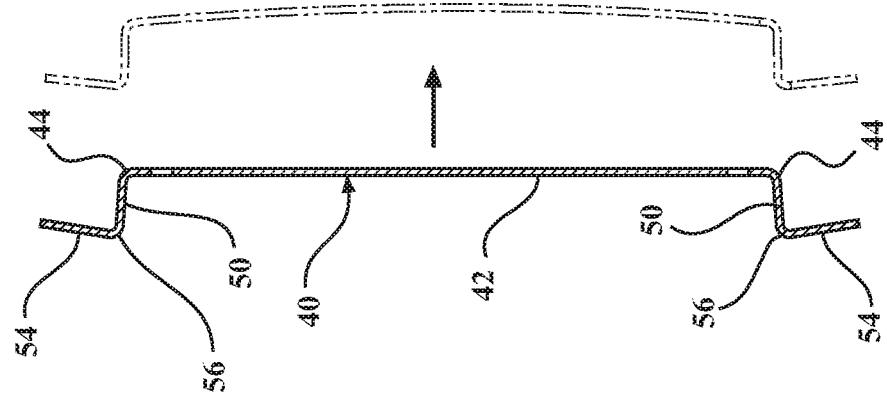
FIG. 8

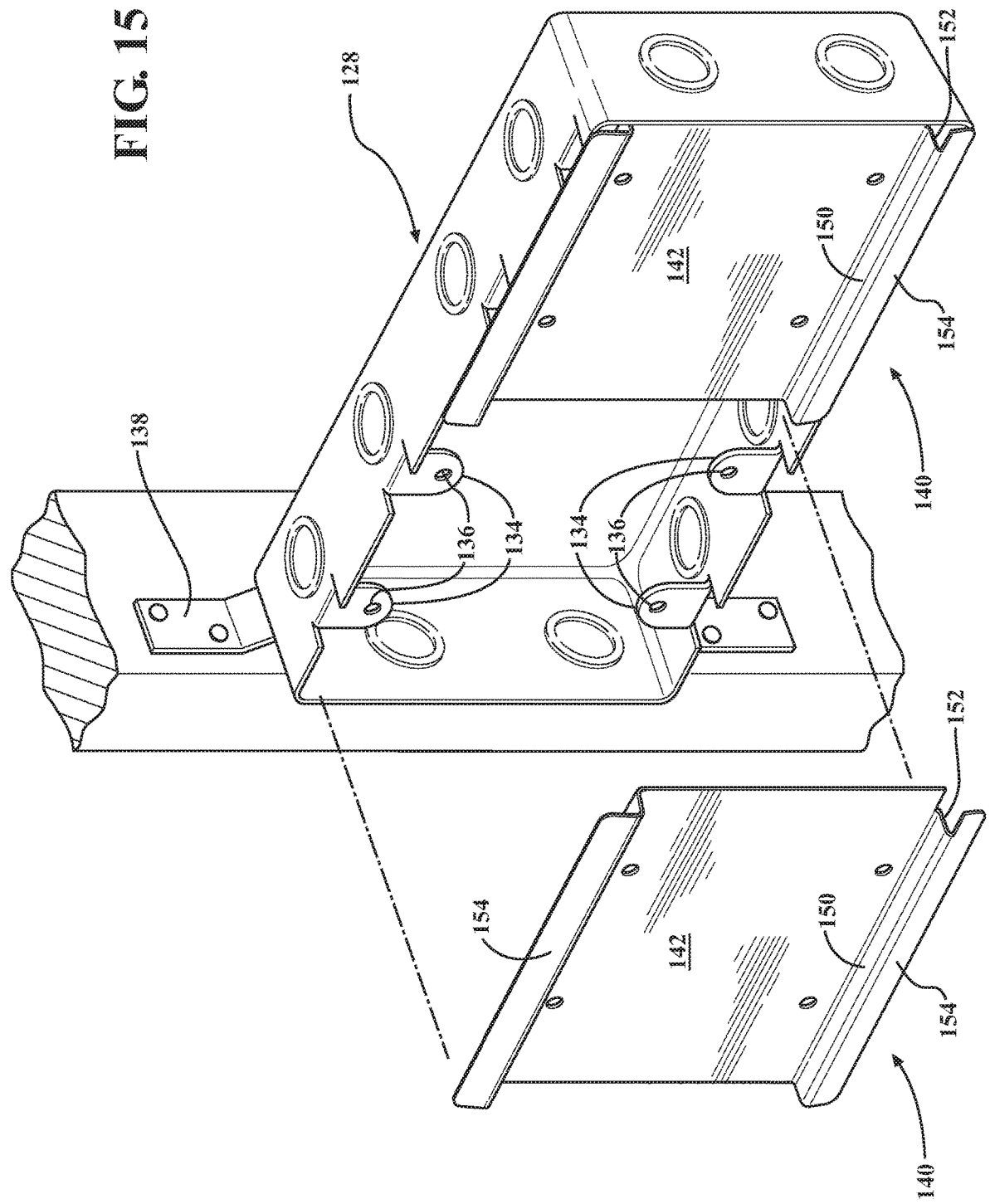

TEMPORARY PROTECTIVE COVER FOR JUNCTION BOXES

CROSS REFERENCE TO RELATED APPLICATIONS

This application claims priority to U.S. Provisional Patent Application 62/754,802 filed on Nov. 2, 2018 and is a Continuation-In-Part of U.S. Design patent application Ser. No. 29/575,769 filed on Aug. 29, 2016, the entire disclosures of which are hereby incorporated by reference and relied upon.

BACKGROUND OF THE INVENTION

Field of the Invention

The invention relates generally to reusable protective covers for temporarily covering the cavity of an electrical/communications junction box during construction.

Description of Related Art

An electrical junction box is an enclosure that provides a safe housing for electrical connections, including connections to accommodate switches, sockets and the associated connecting wiring. Junction boxes allow devices like switches and sockets to be recessed into the wall for a better appearance. Thus, the term "junction box" is used throughout this document in it broadest possible sense and includes without limitation wall boxes, switch boxes, electric boxes, flush boxes, cavity boxes, plasterboard boxes, outlet boxes, pattresses, p-rings, and possibly other terms. Furthermore, while electrical junction boxes are a common application, junction boxes in general may be used for purposes other than electrical wiring, including but not limited to low-voltage, high-voltage, audio systems, communications, water/hydraulic lines, pneumatic lines, secret hiding places, etc.

The typical junction box is made of metal or plastic to standard dimensions. Those designed to accommodate the width of a single device (e.g., a switch or socket) are often referred to as a "single-gang" box. Those having a width suited to accommodate two devices side-by-side are often referred to as a "double-gang" box. Still wider junction boxes for accommodating three devices side-by-side are known as a "triple-gang" box. And so forth continuing the progression. Most junction boxes contain embedded abutment and anchoring features in standard positions for the attachment of devices.

FIG. 1 illustrates an exemplary frame construction wall at the rough-in wiring stage of completion. This view is offered for illustrative purposes only, as those of skill in the construction trades will appreciate the wide variety of other wall construction techniques. However, in this simple illustration, the wall is shown in traditional stick-frame design having a horizontal base plate 20, a horizontal top plate 22 and several vertical members or studs 24 extending between the base 20 and top 22 plates. Junction boxes 26, 28 are shown attached to the studs 24 at strategic locations. The junction box 26 is a single-gang size located near the base plate 20 and is likely intended to receive a single device such as an electrical receptacle (not shown). Junction box 28 is a double-gang size likely intended to receive two switches or other combination of devices (not shown). Both boxes 26, 28 are fed with the ends of electrical wires 30 which may be routed through and secured to the studs 26 and/or plates 20/22 by pass-through holes and staples in the well-known manner.

FIG. 1 generally illustrates completion of the rough-in wiring stage and before installation of wall covering(s). During construction and major re-modeling of both commercial and residential spaces, many of the trades will have a "rough-in" phase. In the electrical trade, the rough-in occurs after the framing has been completed but before the wall covering has been installed. The installation of switches, outlets, fixtures and other devices in the junction boxes will occur during the finish phase as the construction work nears completion.

Returning to FIG. 1 which shows the exemplary wall in electrical rough-in stage, one or both vertical faces of the wall are ready to be covered after any applicable electrical inspection has been completed. One very common and relatively inexpensive wall covering technique is by use of a sheet-like product known variously as drywall, plasterboard, wallboard, sheet rock, gypsum board and the like. For convenience, the term drywall will be used throughout this document to represent the entire class of these types of panel products made chiefly of gypsum and typically extruded between heavy sheets of paper. Other types of sheet-like or panel-like wall coverings alternative to drywall may include lath, plastic panels, plywood, textured wall panels, cement board, fiberglass reinforced panels and the like. Wall coverings of all types are often anchored in place with a combination of adhesive material (e.g., glue) and fasteners (e.g., screws, nails, etc.).

In the wall covering phase, typically the installed junction boxes along with any plumbing, duct-work, insulation and other utilities contained in the walls are temporarily sealed over. Later, a worker carefully cuts out sections of the wall covering around the junction boxes to re-expose the box cavity and the wire ends (or other objects) contained inside. In the course of the wall covering installation and subsequent cut-out processes, the junction boxes and the wire ends inside fill with dust, debris and other contaminants and/or become coated with adhesion material. Even in skilled hands, the wire ends can be inadvertently nicked or cut during the cutout process. Even more contamination can enter the junction box when the wall covering is finished. Joint compound (mud), paint, stucco, varnish or other coatings can easily leak into the box cavity.

Thus, it can be appreciated that junction box contamination and wire damage are two common problems encountered in wall construction. When this happens, a worker must be dispatched to clean out the junction boxes, clean the wire ends and/or replace damaged wire ends before the final finish phase of the electrical work can begin. This unfortunate remediation work can create added expense to the construction budget and introduce delays. And unfortunately, contaminated junction boxes can provoke conflict on the job site as various trade contractors blame each other for causing the problem, leading to distractions, lack of cooperative spirit and additional lost time on the project.

In 2018, the average new US household construction contained an estimated 50 junction boxes or more per dwelling. Assuming each junction box requires several minutes of clean-up on average, many hours of time are typically required to repair wires and/or clean-out junction boxes that had been in perfect condition just prior to the wall covering phase. Nationwide, this repair/clean-up task translates to millions of lost man-hours every year.

Others have recognized the problem of junction box contamination and wire damage caused during installation of wall covering. Previous solutions have included various types of temporary covers inserted in the junction box prior to installation of the wall covering. The temporary covers strive to keep contaminants out of the junction box and protect the integrity of the wire ends inside until start of the final finish phase of the electrical work. Examples of prior art solutions include U.S. Pat. No. 6,906,260 to Grendalh issued Jun. 14, 2005, and U.S. Pat. No. 6,511,269 to Smasne issued Jan. 28, 2003, and U.S. Pat. No. 6,867,369 to Wiggins issued Mar. 15, 2005 and U.S. Pat. No. 7,608,781 to Campagnone, Jr. issued Oct. 27, 2009. These prior art examples suffered from various shortcomings. Some require the use of fasteners to hold the covers in place, creating labor and tool intensive activities. Some require multiple sizes and shapes to fit the various junction box sizes (single-gang, double-gang, triple-gang, etc.) commonly used in construction. As a result of these shortfalls, no protective cover available in the prior art has gained any meaningful traction in the residential or commercial construction marketplaces.

There is therefore a need in the art for an improved device and method for temporarily covering the cavity of a junction box (electrical or otherwise) during the wall covering phase of construction.

BRIEF SUMMARY OF THE INVENTION

According to a first aspect of this invention, a temporary protective cover for a junction box comprises a body having a generally rectangular shape defined by two generally parallel gripping edges and two generally parallel side edges. The protective cover includes a pair of cleats. Each cleat extends from a respective one of the gripping edges. The protective cover includes a pair of stop tabs. Each stop tab extends from a respective one of the cleats along an exterior interface. The side edges of the protective cover are unencumbered by stiffening features.

The present invention is distinguished from the prior art in this first aspect by the absence of reinforcing or stiffening elements along the side edges. As a direct result of unencumbered side edges, a large size junction box (e.g., double-, triple-, quadruple-gang, etc.) can be more easily and effectively covered using multiple covers arranged side-by-side. In order to fit inside the large box in these situations, it may be necessary to overlap one or more protective covers. Because the side edges are unencumbered by stiffening features, overlapping can be accomplished with relative ease and with a more flush fit. Another direct result of unencumbered side edges is that the body is free to bend like a leaf spring when inserted into a junction box. The leaf-spring like behavior of the body will contribute spring tension on the cleats to press the gripping edges into embossments inside the junction box, thus firmly holding the temporary cover in place without the need for additional fasteners. Prior art designs are incapable of body flexing due to side edges that are flanged or otherwise encumbered with reinforcing and/or stiffening features.

According to a second aspect of this invention, a temporary protective cover for a junction box comprises a body having a generally rectangular shape defined by two generally parallel gripping edges and two generally parallel side edges. The protective cover includes a pair of cleats. Each cleat extends from a respective one of the gripping edges. The protective cover includes a pair of stop tabs. Each stop tab extends from a respective one of the cleats along an exterior interface. At least one cleat has a notch therein contiguous with one of the side edges of the body.

One or more notches in the cleats has been found to improve the fit between two overlapping covers. The presence of one or more notches improves the ability for two covers to more gracefully nest in overlap when used to protect larger size junction boxes. Furthermore, the one or more notches also enable a convenient degree of width adjustability. The one or more notches facilitate lateral expansion-contraction of two or more covers when used to fill the cavity larger size junction boxes.

According to a third aspect of this invention, a method for temporarily covering the interior cavity of a junction box facilitates installation of wall covering and/or wall finishing operations. The method comprises the steps of inserting a first temporary cover into the cavity of a junction box to occlude at least a portion thereof. The inserting step includes exerting radially-outward pressure at the opening of the junction box with opposing cleats of the first temporary cover. The inserting step also includes flexing a body of the first temporary cover to generate spring tension.

The body may be designed to bend like a leaf spring when inserted into a junction box. The spring-like behavior of the body contributes spring tension to press opposing cleats against the opening of the junction box to firmly holding the temporary cover in place without the need for additional fasteners. As previously stated, prior art designs are incapable of body flexing due to side edges that are flanged or otherwise encumbered with reinforcing and/or stiffening features.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 5 is a top view of the temporary protective cover of FIG. 4;

FIG. 6 is a side view of the temporary protective cover of FIG. 4;

FIG. 7 is an end view of the temporary protective cover of FIG. 4;

FIG. 8 is simplified cross-section view through a typical junction box containing rough-in wiring wires and poised to receive a temporary protective cover therein and with the temporary protective cover shown in phantom lines installed in an operative position;

FIG. 15 is a perspective view of an alternative embodiment of protective cover sized to fit wide junction box applications.

DETAILED DESCRIPTION OF THE INVENTION

Figure 1:
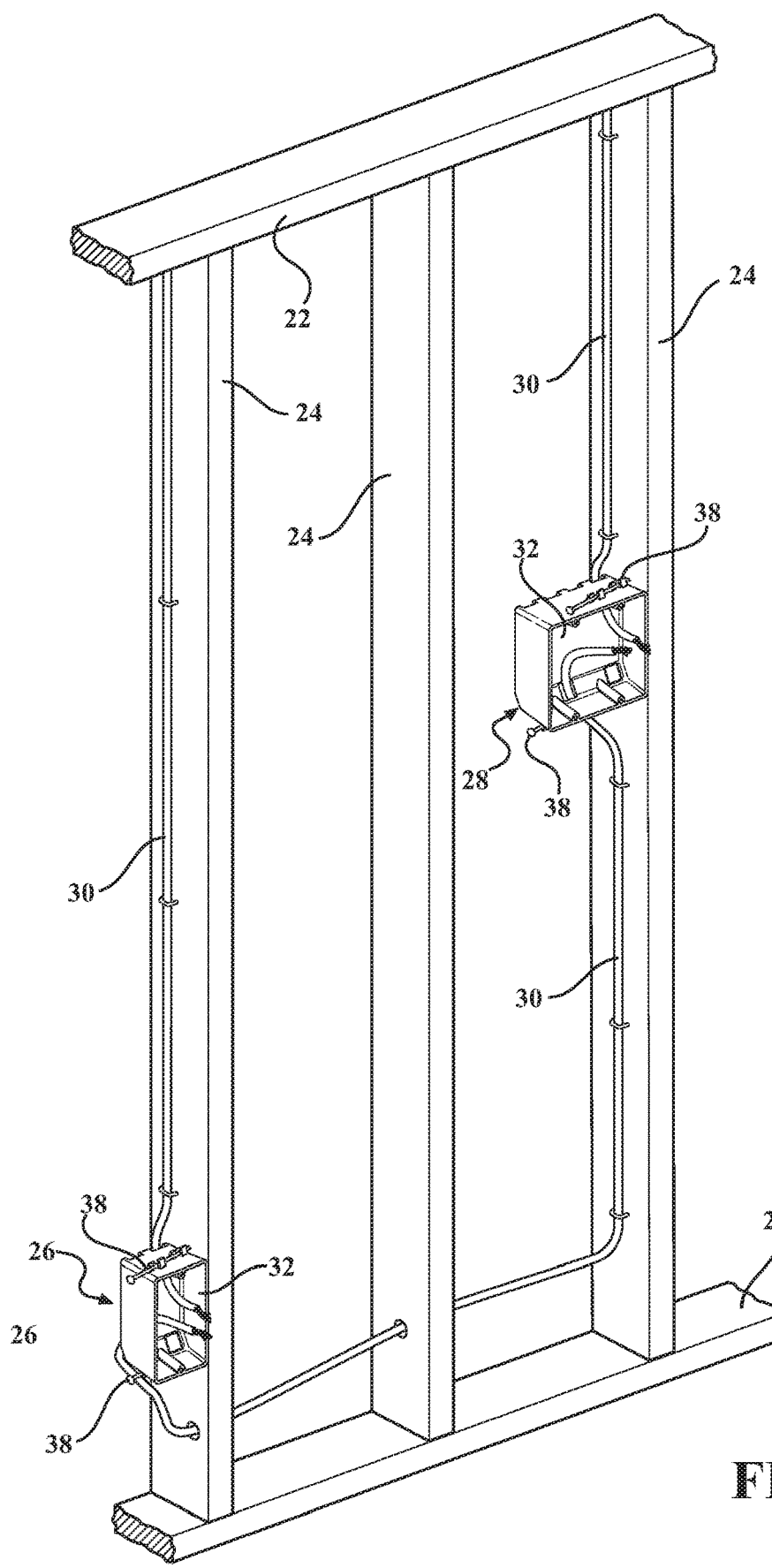
FIG. 1 is an environmental view showing an exemplary rough construction scenario in which electrical junction boxes are fed with electrical wires at completion of a rough-in wiring stage and before installation of drywall or other wall covering.
Figure 2:
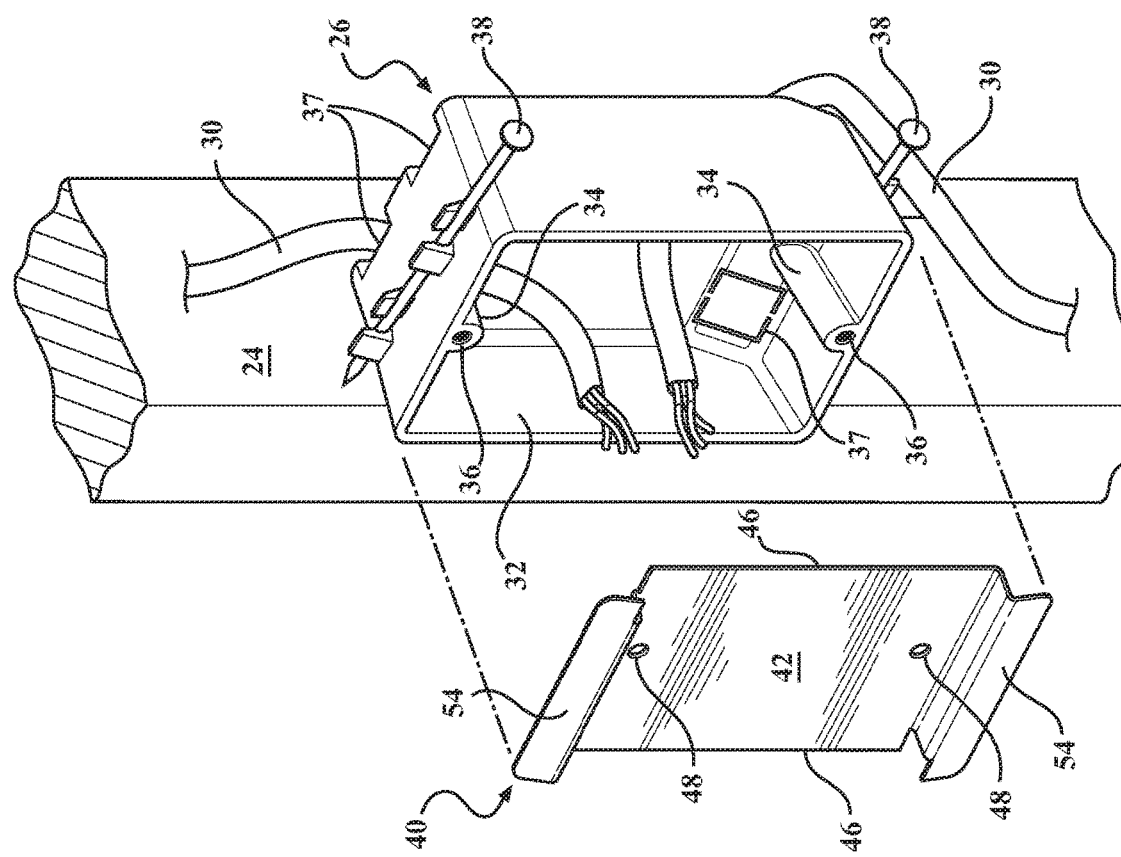
FIG. 2 is a close-up view of a typical single-gang junction box attached to a vertical support member and poised to receive a temporary protective cover according to one exemplary embodiment of the invention.

FIG. 2 depicts an exemplary single-gang junction box 26 attached to a vertical support member 24, such as a wood or steel stud. In other contemplated applications, the junction box 26 could be attached to a timber or post or column or block or other structural member of a wall. The junction box 26 has an internal cavity 32. The internal dimensions of the cavity 32 at its face, or open end, that is its internal height and width, are generally the same for all single-gang sizes throughout the wide range of different manufacturers. As is the case for double- 28, triple-, quadruple-, etc. size junction boxes as the opening measurements must be generally standardized to fit common devices like switches and receptables. However, the depth of the cavity 32 will vary from one junction box to the next. Within each cavity 32, located at opposite (usually top and bottom) sides are embossments 34 formed around screw holes 36. The screw holes 36 are provided to support/anchor a device, such as a switch or receptacle. For metal junction boxes 26, 28, the embossments 34 may take the form of a bent tab of metal. (See for example FIG. 15.) For plastic junction boxes 26, 28, the embossments 34 are more likely thick ridge-like features molded in position. In addition, the junction box 26, 28 may include one or more wire management features, which could include pass-through holes 37 (FIG. 8) and wire gripping elements (not shown). Externally, the junction box may include mounting appliances, such as captive nails 38 (FIG. 1), nailing flanges (not shown) and the like. For the avoidance of doubt, the principles of this invention are equally-applicable to all types of junction box applications, including but not limited to residential and commercial and aerospace and marine and so forth.

Figure 3:
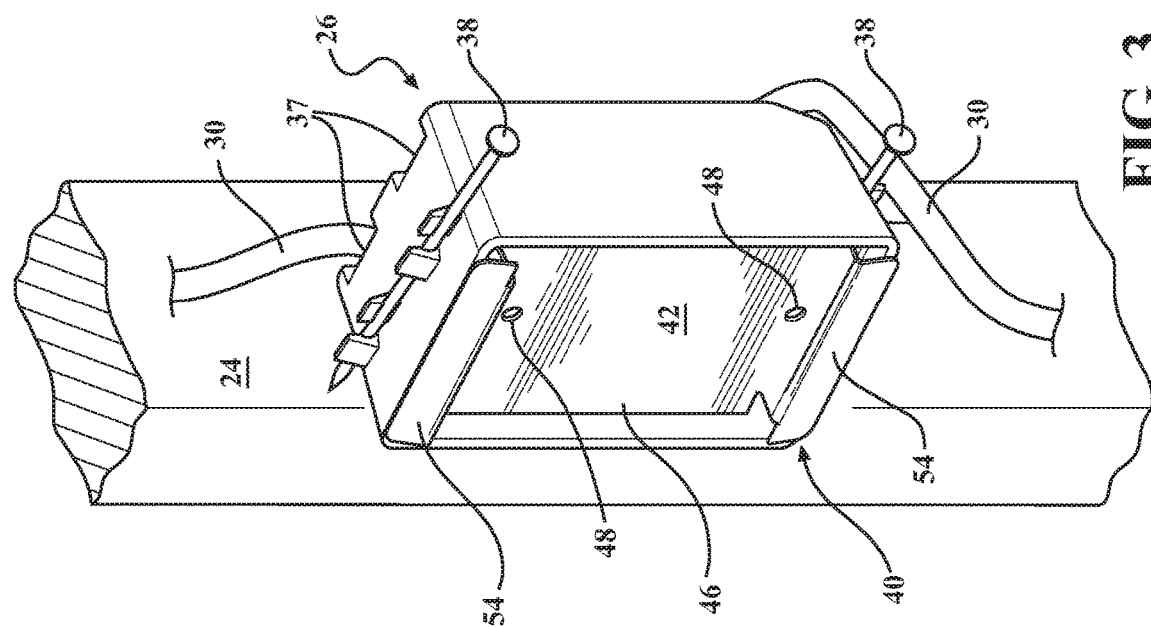
FIG. 3 is a view as in FIG. 2 showing the temporary protective cover installed in an operative position therein.

After a rough-in wiring inspection has been made, and before installing the selected type of wall covering, a temporary protective cover according to the present invention is installed in the junction box 26. The temporary protective cover is generally shown at 40 in FIG. 2 exploded away from the open face of the junction box 26. FIG. 3 is a view as in FIG. 2 showing the protective cover 40 installed in the junction box 26 in an operative position ready for wall covering.

Figure 4:
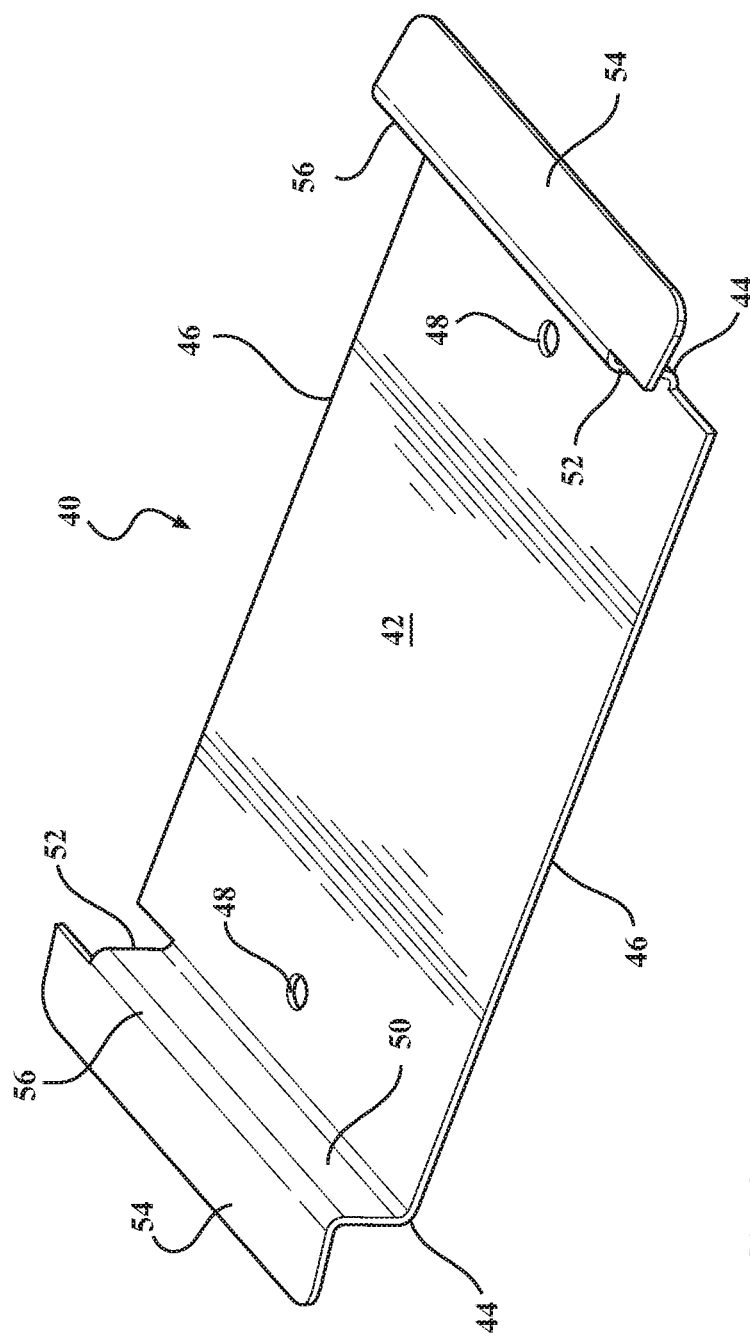
FIG. 4 is a perspective view of a temporary protective cover according to one exemplary embodiment of the invention.

FIGS. 4-7 shown the temporary cover 40 from various perspectives. The large, flat interior region of the temporary cover 40 comprises its body 42. The body 42 is preferably fabricated from a rigid sheet-like material that has a generally constant body thickness. Metal is a preferred material choice; however plastics, heavy papers and other material compositions may offer interesting benefits worth considering as alternatives to metal. As perhaps best appreciated from FIG. 5, the body 42 has a generally rectangular shape defined by two generally parallel gripping edges 44 and two generally parallel side edges 46. It is noteworthy to mention that the side edges 46 are, preferably, not reinforced relative to the remainder of the body 42. That is to say, in the preferred embodiments of this invention the side edges 46 are unencumbered by flanges or ribs or any of form of stiffening agent that would inhibit flex of the body about an imaginary axis parallel to the gripping edges 44. The un-flanged nature of the side edges 46 enables the body 42 to flex or bend only in a way that allows the gripping edges 44 to remain relatively straight and parallel to one another at all times at the sacrifice of the side edge 46. Thus, as shown in FIG. 4, the side edges 46 are merely the unadorned boundaries, or terminations, of the body 42 extending more-or-less linearly between the gripping edges 44 on either end. The distance between the gripping edges 44 comprises a body length and the distance between the side edges 46 comprises a body width. The side edges 46 correspond with the body length and appear substantially uninterrupted (by flanges or stiffening elements) with the body 42.

Optionally, one or more removal holes 48 may be disposed in and pass directly through the body 42. The removal hole(s) 48 are preferably sized to easily accommodate a section of the most common electrical wire sizes found in construction sites. For example, a removal hole 48 drilled at ⅛" (0.125 in.) will receive wire sizes up to 10-gauge (bare) without frictional interference. The purpose of the removal hole 48 is to aide in the separation of a temporary cover 40 from a junction box 40 after the wall covering has been installed and finished. Accumulations of adhesives, coatings and other debris could resist separation of the cover 40 from the face of the junction box 26. A small bend formed on the end of a scrap piece of wire (not shown) can be inserted into the removal hole 48 like a hook and used to help dislodge the temporary cover 40. Preferably, the removal hole 48 is centered between the side edges 46 but disposed spatially closer to a selected one of the gripping edges 44. Although it is possible to locate the removal hole 48 in the geometric center of the body 42, such is not ideal because pulling forces will be more-or-less equally distributed around the periphery of the cover 40. On the other hand, when removal hole 48 is located very close to one of the gripping edges 44, the pulling forces can be concentrated along the one adjacent gripping edge 44 thus facilitating easier cover 40 separation from the junction box 26 (or 28, etc.).

The temporary protective cover 40 includes a pair of cleats 50. As best seen in FIGS. 4 and 7, each cleat 50 extends from a respective one of the gripping edges 44 along an interface that is preferably, but not necessarily a rounded edge. The gripping edges 44 lay along the intersection between body 42 and cleats 50, each then forming a somewhat protruding feature capable of pressing in line-contact against the inside of an electrical box 26—particularly against the typical embossments 34 formed around the screw holes 36. See FIGS. 8 and 9.

Each gripping edge 44 has a cleat width equal to or less than the body width. That is to say, at least one of the cleats 50 may be narrower in width than the body width. In the illustrated examples, both cleats 50 are narrower than the body width. The cleats 50 can take many different forms, but in the depicted examples each cleat 50 is integrally-fabricated from the same rigid sheet-like material as the body 42 so that the material thickness of each cleat, i.e., the cleat thickness, is likewise generally constant and generally equal to the body thickness. However, it is contemplated that in some variations one or both cleats 50 could be separately formed and then attached to the body 42 either fixedly or through a hinge-like, possibly resilient, arrangement. The cleats 50 can be created as integral formations with the body 42 by bending from a common piece of sheet metal.

Each cleat 50 has a generally constant cleat height. That is to say, the measure of each cleat 50 as taken from the associated gripping edge 44 remains generally the same across its full width. This cleat height establishes an offset distance for the body 42, for reasons to be explained, and can function satisfactorily over a wide range of sizes. In the preferred embodiments, the cleat height is between about 3-20 times the body thickness and/or the cleat thickness. Best results have been achieved when the cleat height is between about 10-15 times the body thickness and/or the cleat thickness. In the illustrated examples, the cleat height is shown at about 12-13 times the body thickness and/or the cleat thickness.

Figure 9:
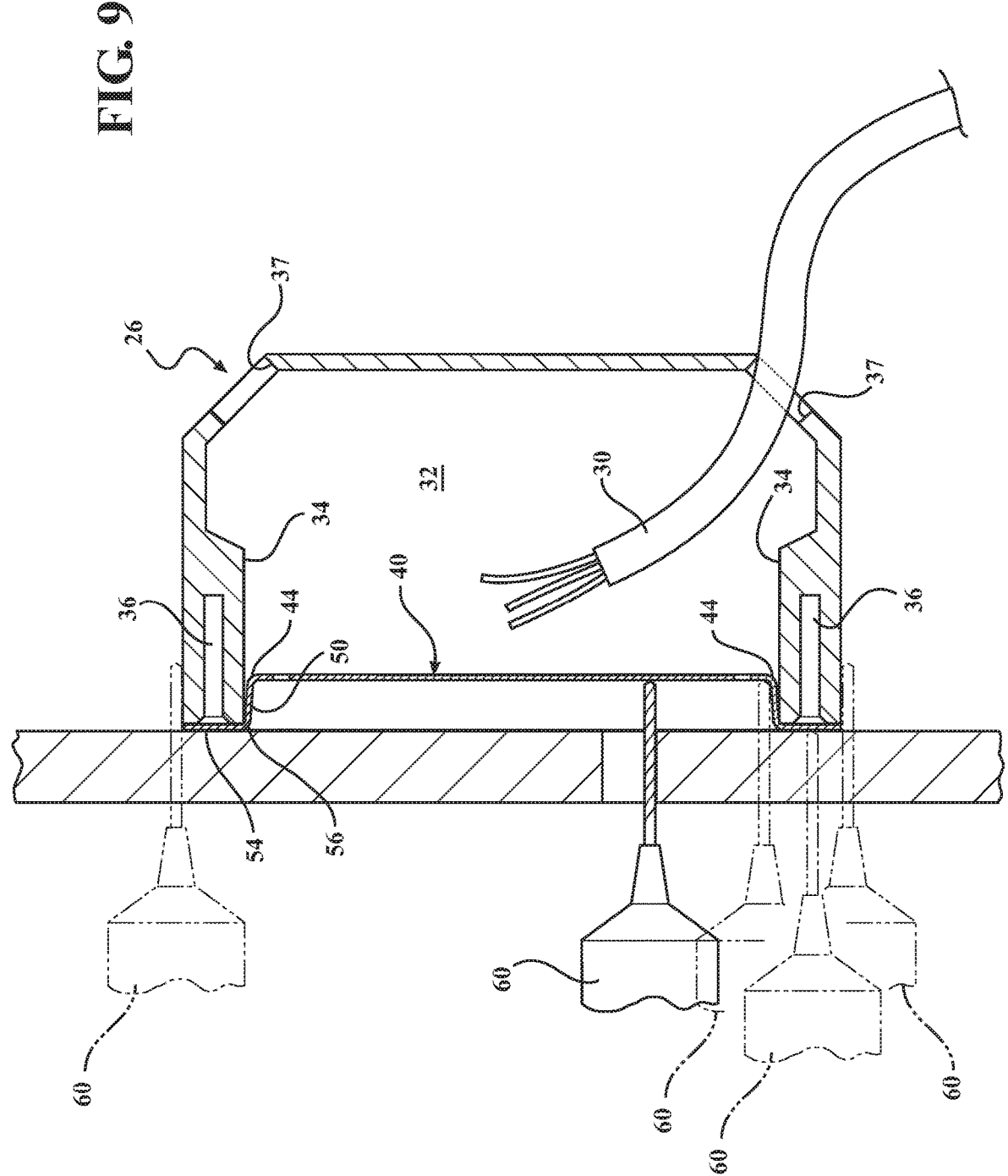
FIG. 9 is a view as in FIG. 8 but showing a further progression of the construction process wherein a wall covering overlies the junction box and with a rotary cut-out tool shown in phantom lines in the process of creating an opening for the junction box.

As previously stated, the gripping edges 44 are formed at the respective corner-like interfaces of the body 42 and the cleats 50. The gripping edges 44 are designed to correspond to the locations of the embossments 34 in any standard junction box 26, as shown in FIGS. 8 and 9. When a junction box 26 (or 28) is mounted so that its screw mounting holes 36 are vertically-aligned, as in FIGS. 1 and 2, the gripping edges 44 will be at the top and bottom of the body 42, with each gripping edge 44 running horizontally and each side edge 46 running vertically.

Each gripping edge 44 has a generally constant included angle measured between the cleat 50 and the body 42. At least one of the included angles is, preferably, a non-right angle causing its associated cleat 50 to cant with respect to the body 42. In the illustrated examples, both included angles are non-right angles. As perhaps best seen in FIG. 6, the included angles between the body 42 and the respective cleats 50 are both obtuse and generally equal angular measure. However, in other contemplated embodiments the included angle will be acute. In the preferred embodiments, the included angles are between about 91-135 degrees for obtuse versions, or between about 45-89 degrees for acute versions. As will be explained in greater detail, the obtuse versions create radially-outward pressure at near the opening of the junction box 26 (or 28) by spring pressure at the tops of the opposing cleats 50. However, the acute versions create radially-outward pressure below the opening of the junction box 26 (or 28), deeper inside the cavity 32, by spring pressure of the gripping edges 44. Both variations have been found to provide satisfactory results.

Returning to FIGS. 4, 5 and 7, it can be seen that at least one cleat 50 has a notch 52 therein contiguous with one of the side edges 46 of the body 42. The notch 52 is an optional feature and can be formed in one or both cleats 50. The presence of a notch 52 causes its associated cleat 50 to have a width narrower than the body width. Conversely, the absence of a notch 52 means that the cleat 50 is likely to have a width generally equal to the body width. In the illustrated examples, notches 52 are provided in each cleat 50, along opposite side edges 46 so form a diagonal relationship with respect to the generally rectangular shape of the body 42. The one (or each) notch 52 has a notch width as measured in from the associated side edge 46. In the preferred embodiments, the notch width is between about 5-16 times the body thickness and/or the cleat thickness. Best results have been achieved when the notch width is between about 8-13 times the body thickness and/or the cleat thickness. In the illustrated examples, the notch width is shown at about 11 times the body thickness and/or the cleat thickness.

The temporary protective cover 40 includes a pair of stop tabs 54. As best seen in FIGS. 4-6, each stop tab 54 extends from a respective one of the cleats 50 along a common exterior interface 56. To facilitate comfortable and safe handling, the exterior interface 56 may be formed as a smoothly-rounded edge. Likewise, each stop tab 54 may have rounded corners or ears. The width of the exterior interface 56 may be equal to or less than the body 42 width. That is to say, the width of the exterior interface 56 is typically equal to the width of the cleat 50. If the associated cleat 50 contains a notch 52, the width of the stop tab 54 will be greater than the width of its associated cleat 50 and exterior interface 56. However, in the case of no notch 52, the stop tab width will be equal to both that of its cleat 50, its exterior interface 56 and the body 42.

Each stop tab 54 is preferably fabricated from a rigid sheet-like material and has a generally constant thickness. The stop tabs 56 can take many different forms, but in the depicted examples each stop tab 54 is integrally-fabricated from the same rigid sheet-like material as the body 42 and cleats 50 so that the material thickness of each stop tab 54 is likewise generally constant and generally equal to the body thickness and/or the cleat thicknesses. However, it is contemplated that in some variations one or both stop tabs 56 could be separately formed and then attached to the body 42. The stop tabs 56 can be created as integral formations with the body 42 by bending from a common piece of sheet metal.

Each stop tab 54 has a generally constant tab reach, which is measured laterally from the exterior interface 56. In the preferred embodiments, the tab reach is between about 10-20 times the body thickness and/or the cleat thickness and/or the stop tab thickness. Best results have been achieved when the tab reach is between about 12-18 times the body thickness and/or the cleat thickness and/or the stop tab thickness. In the illustrated examples, the tab reach is shown at about 15 times the body thickness and/or the cleat thickness and/or the stop tab thickness. The reach of the stop tabs 54 may be designed to closely match the outer dimensions of most standard electrical boxes 26 to achieve a generally matched fit as shown in FIG. 3.

Each exterior interface 56 presides at or generally at the vertex of a take-off angle measured between the stop tab 54 and the respective the cleat 50. The take-off angles are best seen in FIG. 6 as being constant along the length of each cleat 50. The take-off angles are preferable non-right angles, however in some contemplated embodiments a right take-off angle could be used with one or both stop tabs 56 with satisfactory results. FIG. 6 in particular depicts each take-off angle as being acute, in the range of between about 45-89 degrees.

Figure 10:
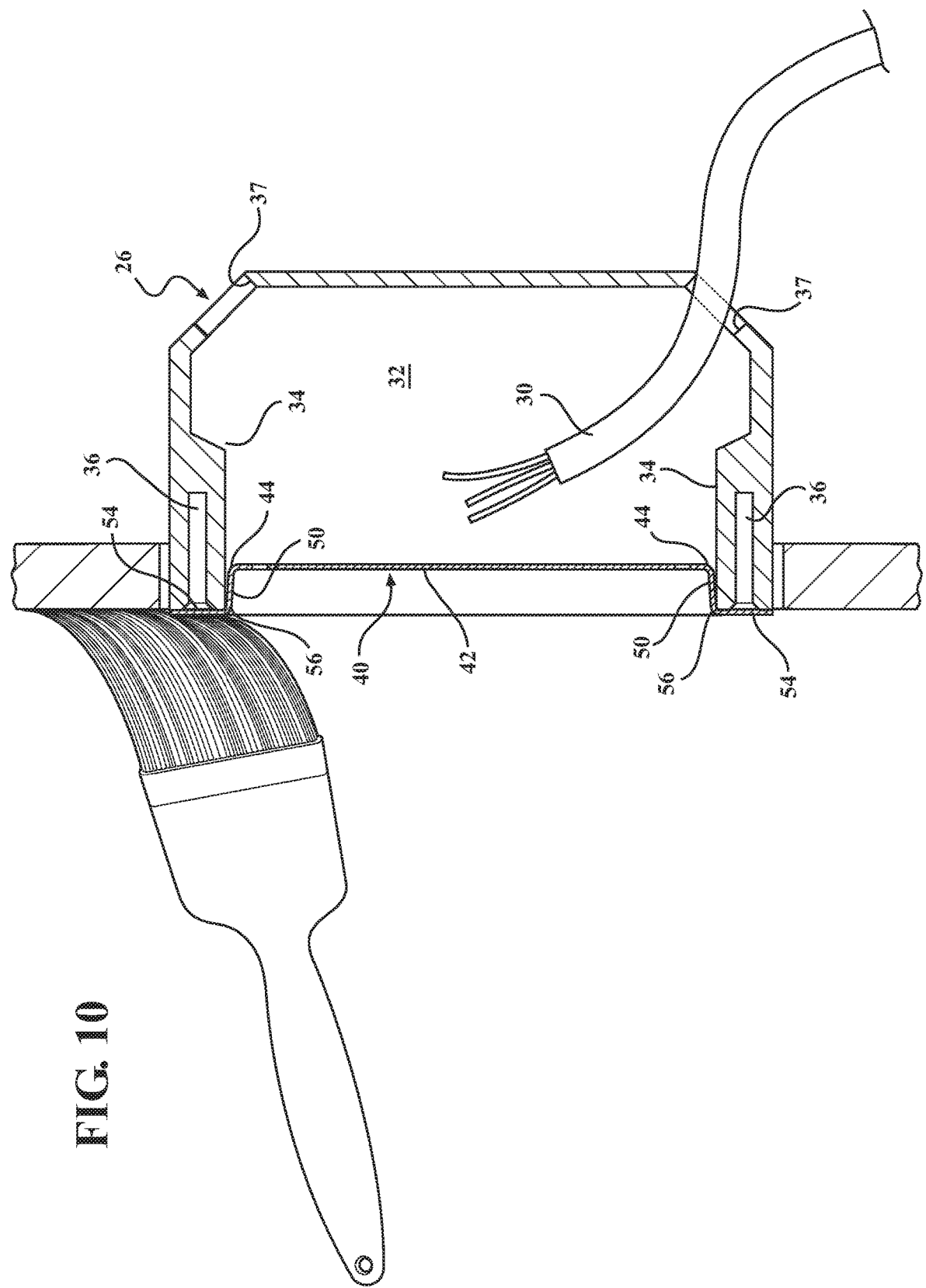
FIG. 10 is a view as in FIG. 9 but showing a further progression of the construction process wherein the wall covering is finished while the temporary protective cover remains in position occluding its cavity.

Turning now to FIGS. 8-10, a method of using the temporary protective cover 50 will be described in detail. The method comprises the step of inserting a temporary cover 40 into the cavity 32 of a junction box 26 to occlude at least a portion thereof and thereby facilitate subsequent installation of wall covering and/or wall finishing and/or finish electrical operations. The stop tabs 54 serve as limiters when they come into contact with the outer face of the box 26, arresting continued penetration of the cover 40 into the cavity 32.

FIGS. 8-10 depict cross-sections through a simplified representation of a plastic junction box 26. (The single-gang box 26 fairly represents the situation for a double-gang box 28, as well as larger box sizes.) The inserting step includes exerting radially-outward pressure in the vicinity of the opening of the junction box with opposing cleats 50 of the first temporary cover. This is graphically depicted as pressure arrows associated with the phantom position of the cover 40 in FIG. 8. In Prior to covering the junction box 26 with a wall covering (FIG. 9), the snap-in cover 40 is pressed into the open cavity 32 of the junction box 26. At the time of cover 40 installation, the electrical wires 30 will have been routed inside the box 26 but not yet connected to a fixture or device (e.g., receptacle, switch, etc.). The temporary cover 40 is dimensioned so that the spacing between its cleats 50 is very slightly larger than the distance between embossments 34. (By surveying junction boxes 26, 28 available on the market from a variety of manufacturers, a maximum working dimension between embossments 34 can be determined.) Because the measurement between the cleats 50 will be larger than the distance between the embossments 34, a force-fit is required.

If the cleats 50 are designed with an obtuse included angle relative to the body 42, as shown in FIG. 6, the maximum spacing between the cleats 50 will occur just under the exterior interfaces 56 adjacent the stop tabs 54. In this case, the cleats 50 will flex with wedge-like action pressing in opposite directions against the opening of the cavity 32. It is possible, perhaps even likely, that the body 42 will naturally deflect or bow when pushed into the cavity 32, as illustrated in FIG. 8, contributing further spring tension on the cleats 50 as they press into the embossments 34. Thus, the inserting step includes flexing the body 42 of the temporary cover 40 to generate spring tension. This flexing of the body 42 is an intentional and beneficial design feature, enabled by the un-encumbered side edges 46. That is, by not reinforcing or stiffening the side edges 46 with flanges or other strengthening features, the body 42 is free to bend like a leaf spring when inserted into a junction box 26. While the side edges 46 are thus encouraged to bend in use, the gripping edges 44 are designed to resist flexure because of the flange-like cleat 50 formations.

On the other hand, if the cleats 50 are designed with an acute included angle relative to the body 42, the maximum spacing between the cleats 50 will occur at the gripping edges 44. In this case, the gripping edges 44 will establish the interference fit and press against the opposing embossments 34. In this alternative embodiment, the body 42 will naturally deflect or bow with even more pronounced concavity than would be expected in the preceding example as the temporary cover 40 is pushed into the cavity 32. Again, the inserting step is shown to include the step of flexing the body 42 of the temporary cover 40 to generate spring tension. Thus, the leaf-spring like behavior of the body 42 will contribute all spring tension on the cleats 50 to press the gripping edges 44 into the embossments 34. Again, the resilient nature of the body 42 is used to exert a spring force that causes the cleats 50, and more particularly their gripping edges 44, to press against the embossments 34, thus firmly holding the cover 40 in place without the need for additional fasteners. Prior art designs are incapable of body flexing due to side edges that are flanged or otherwise encumbered with reinforcing and/or stiffening features.

Once the temporary cover 40 has been installed in the manner described, the wall covering can be installed. FIG. 9 shows an exemplary sheet covering in the form of drywall 58. It must be understood, however, that the temporary cover 40 and its methods of use are not limited to drywall 58 specifically; other forms of wall covering may be used without departing from the spirit and scope of this invention. As shown in FIG. 9, initial application of the drywall 58 has the temporary effect of hiding the junction box 26. A worker must eventually cut-out the drywall 58 or other wall covering around the junction box 26 so that the drywall 58 can be fully secured to studs 24 and eventually finished (i.e., taped and mudded) prior to painting.

FIG. 9 details the cut-out process with the use of a rotary cutting tool 60. One advantage of selecting an iron-based metallic material for the cover 40 is that at this stage the location of the box 26 can be easily determined with use of a strong magnet (not shown). It is only necessary to identify the approximate center of the cavity 32 of the junction box 26, before plunging the tip of a rotary cutting tool 60 through the drywall 58. The tip of the cutting tool 60 will impact the body 42 of the cover, sending an immediate haptic and audible response confirming that the tool 60 is in contact with the cover 40. The solid body 42 acts as a stop to over-penetration of the tool 60 tip, thereby protecting the wires 30 from cut damage by the tool 60. That is to say, the use of metal material for the cover 40 creates a protective barrier therefore protecting the wires 30 sheltered behind the body 42. After making tip contact with the body 42, the installer then pushes the tool 60 toward either of the cleats 50 at the ends of the cover 40, as indicated by the tool 60 in solid lines at A. Contact of the rotary bit with the cleat 50 (shown in phantom lines at B) will send another haptic and audible response confirming that the tool 60 has reached the cleat 50. The installer then withdraws the bit without losing contact against the cover 40, until reaching the stop tab 54. The tool 60 is then intuitively moved (shown in phantom lines at C) to the outer edge of the box 26 and plunged to full working depth (shown in phantom lines at D) as the outer perimeter of the box 26 is traced with the rotating bit (shown in phantom lines at E). Once a complete circuit has been made, the unwanted slug or core of drywall 58 is discarded to reveal the temporary cover 40.

As can be appreciated from the view of FIG. 10, it would not be advantageous to expose the cavity 32 of the junction box 26 during the drywall 58 taping and painting stages, lest the cavity 32 and any electrical wires 30 therein become contaminated with sanding dust, joint compound (i.e., drywall mud) and/or paint. By leaving the temporary cover 40 in place in the box 26, the drywall taper/finisher and the painter can easily work around the junction boxes 26, 28 without concern about filling them with debris.

After the painting is completed, the temporary covers 40 are removed to reveal clean cavities 32 and clean wires 30 for the electrician to finish the wiring tasks. To facilitate removal of the covers 40, a small stem of bent wire or a tool can be inserted into a removal hole 48 and used as purchase point upon which to pull, as described above. Such holes 48 are shown in exemplary form in several of the drawings. Naturally, the removal hole(s) 48 could take many different configurations.

FIGS. 11-14 illustrate another advantage of the temporary covers 40—namely the inherent ability to scale for use in double-gang junction boxes 28, as well as triple-, quadruple- and so forth sizes. The ability to overlap covers to accommodate larger junction boxes 28 will be helpful to the installer who can adapt in-the-field to different junction box sizes with but a single common-size cover 40. The overlapping technique is enabled by the side edges 46 which are free from flanges. That is to say, by thinly forming the side edges 46 to single-sheet thickness co-planar with the body 42, a side edge portion of one cover 50 may neatly overlie a side edge portion of another cover 40 producing only a very thin bulge. Prior art designs are incapable of overlapping due to side edges that are flanged or otherwise encumbered with reinforcing features.

This scaling feature may be expressed as the method step wherein the previously-described cover 40 installation procedure can be understood as the installation of a first temporary cover 40. The method includes the step of partially overlapping the first temporary cover 40 with a second temporary cover 40 to further occlude the cavity 32 of the junction box 28. As with the first temporary cover 40, the partially overlapping step includes exerting radially-outward pressure in the vicinity of the opening of the junction box 28 via the opposing cleats 50 of the second temporary cover 40. In particular, either the exterior interfaces 56 or the gripping edges 44 of the cleats 50 are brought to bear against the embossments 34 of the junction box 28, depending on the acute vs. obtuse design of the included angle. And in either case, the bodies 42 of both the first and second covers 40 flex upon insertion into the cavity 32, thus generating spring tension as the primary retention method to hold the covers 40 in the junction box 28.

In some embodiments, it has been found advantageous to form one or more notches 52 in the cleats 50 to improve the fit between two overlapping covers 40. In this case, the partially overlapping step can include receiving a portion of at least one cleat 50 of the first temporary cover into a notch in the cleat 50 of the second temporary cover, or vise-versa depending on the order of insertion.

Figure 11:
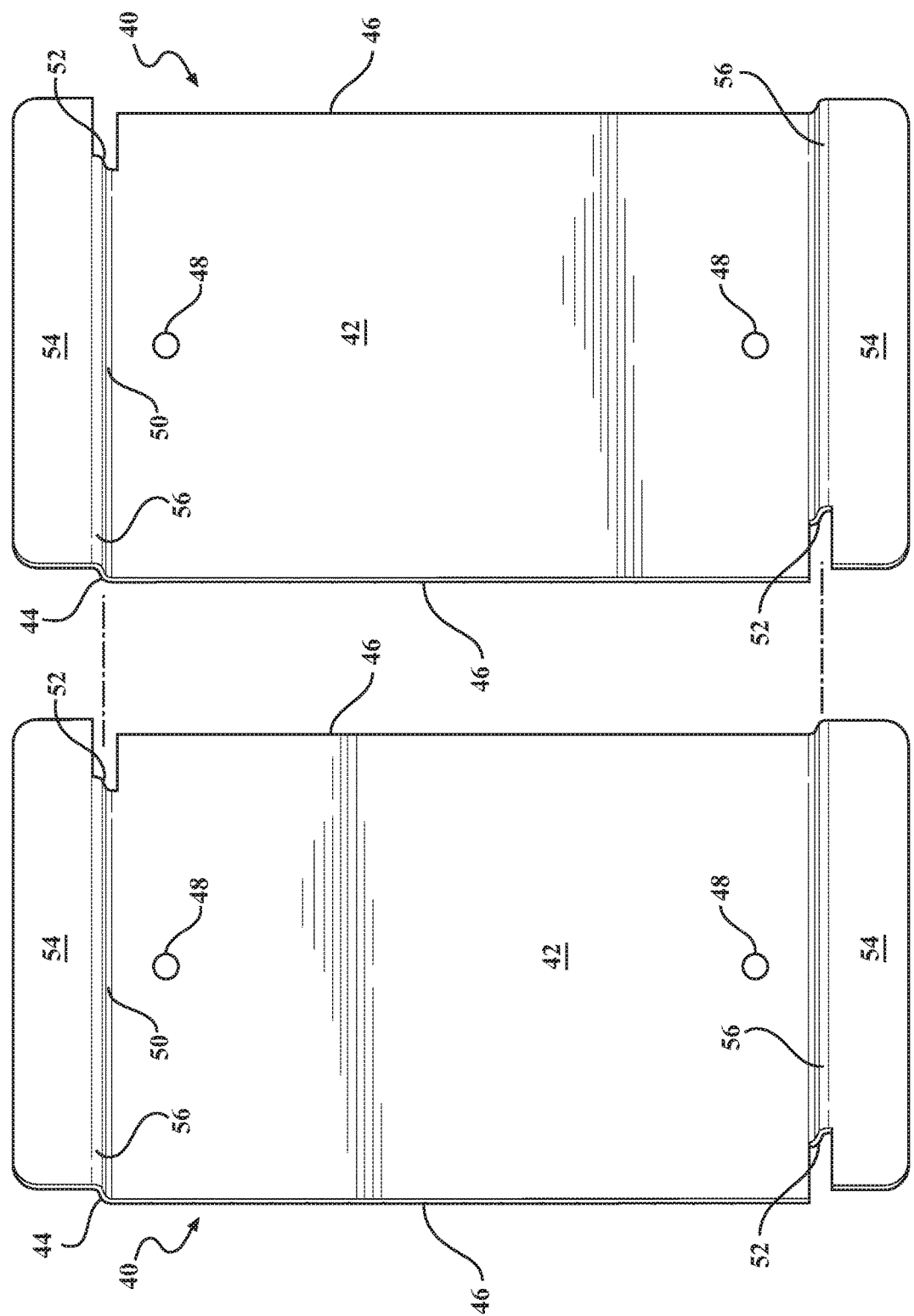
FIG. 11 is a perspective view showing two temporary protective covers poised to be fit in over-lapping relationship for installation into a double-gang junction box.
Figure 12:
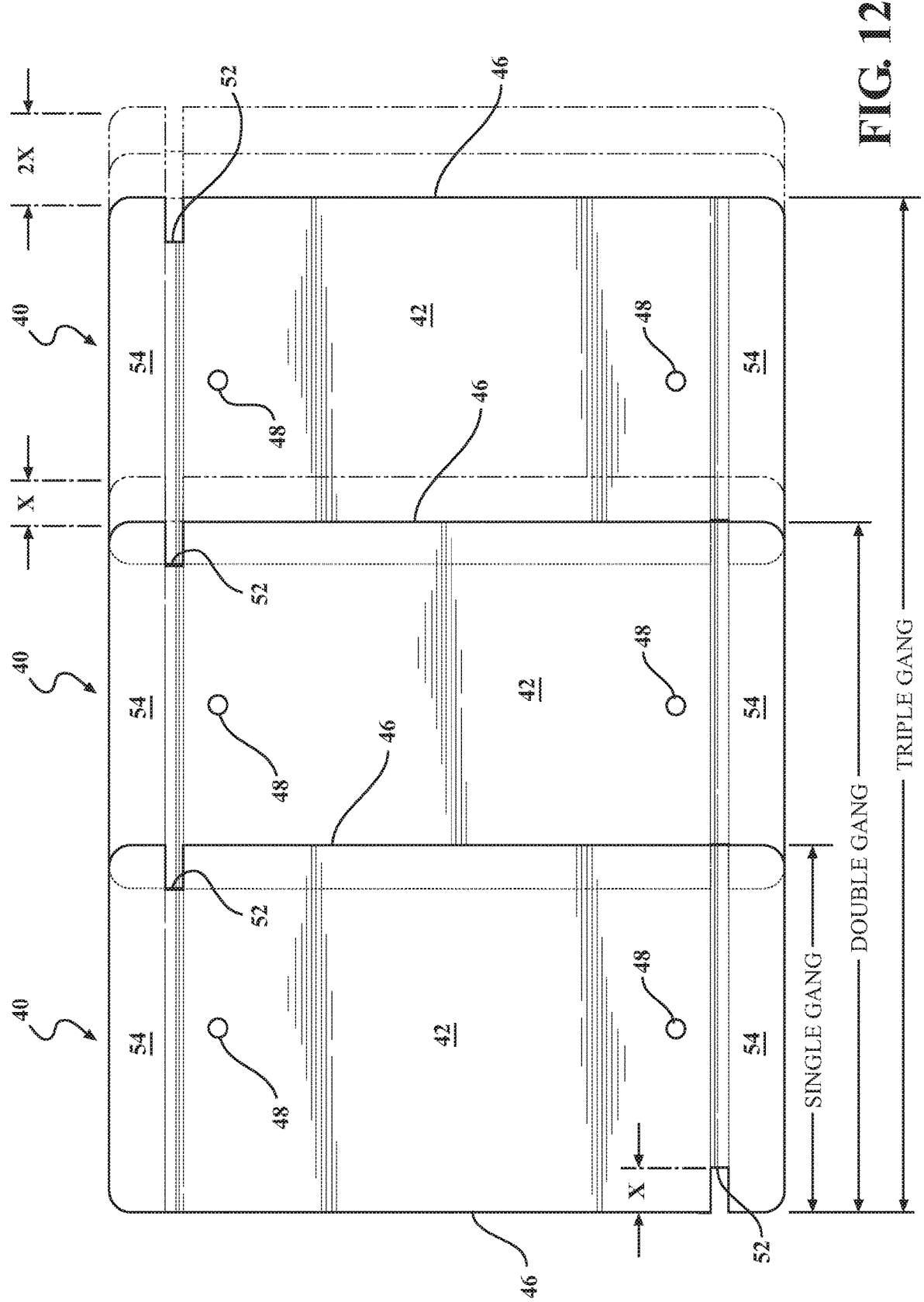
FIG. 12 is a top view of three temporary protective covers in over-lapping relationship for installation into a triple-gang junction box, and with phantom lines indicating width variability to accommodate different makes and models of junction boxes.

FIGS. 11 and 12 illustrate diagonally-opposed notches 52, however in contemplated alternative embodiment a single notch 52 is possible, as well as two notches 52 per cover 40 aligned on the same side edge 46 (not shown), and four notches 52 per cover 40 (not shown). Again, it should be emphasized that the presence of notches 52 is optional and serves primarily as a means to improve the ability for two covers 40 to more gracefully nest in overlap when used to protect double-gang 28 and larger size junction boxes.

While the widths of junction boxes are fairly standardized, there is nevertheless some variability, which variability tends to increase as box size increases. That is, a survey of single-gang junction boxes 26 from numerous manufacturers may indicate a certain variability in widths, where the single-gang variability is calculated as box $width_{max}$ minus box $width_{min}$. Using this same technique, a survey of widths of commercially-available double-gang junction boxes 28 is likely to indicate a double-gang variability greater than the single-gang variability. And still further, a survey of widths of commercially-available triple-gang junction boxes is likely to indicate a triple-gang variability greater than the double-gang variability. And so on for even large size junction boxes. The significance of this observation is that when scaling up to fit the one, common-size cover 40 into double-, triple-, etc. junction boxes there is a likelihood that a considerable degree of flexibility will be needed to match the covers 40 to the actual width of a given cavity 32 in the field.

Toward this end, the notches 52 also enable a convenient degree of width adjustability, as shown in FIG. 12. The notch width is represented by the variable X. When two covers 40 are used to occlude the cavity 32 of a double-gang junction box 28, the amount of width adjustability for the combined covers 40 is equal to X. When three covers 40 are used to occlude the cavity 32 of a triple-gang junction box, the amount of width adjustability for the combined covers 40 is equal to 2x. And so forth. Thus, another benefit of the notches 52 is to facilitate lateral expansion-contraction of two or more covers 40 when used to fill the cavity 32 of double-gang 28 and larger size junction boxes.

Figure 13:
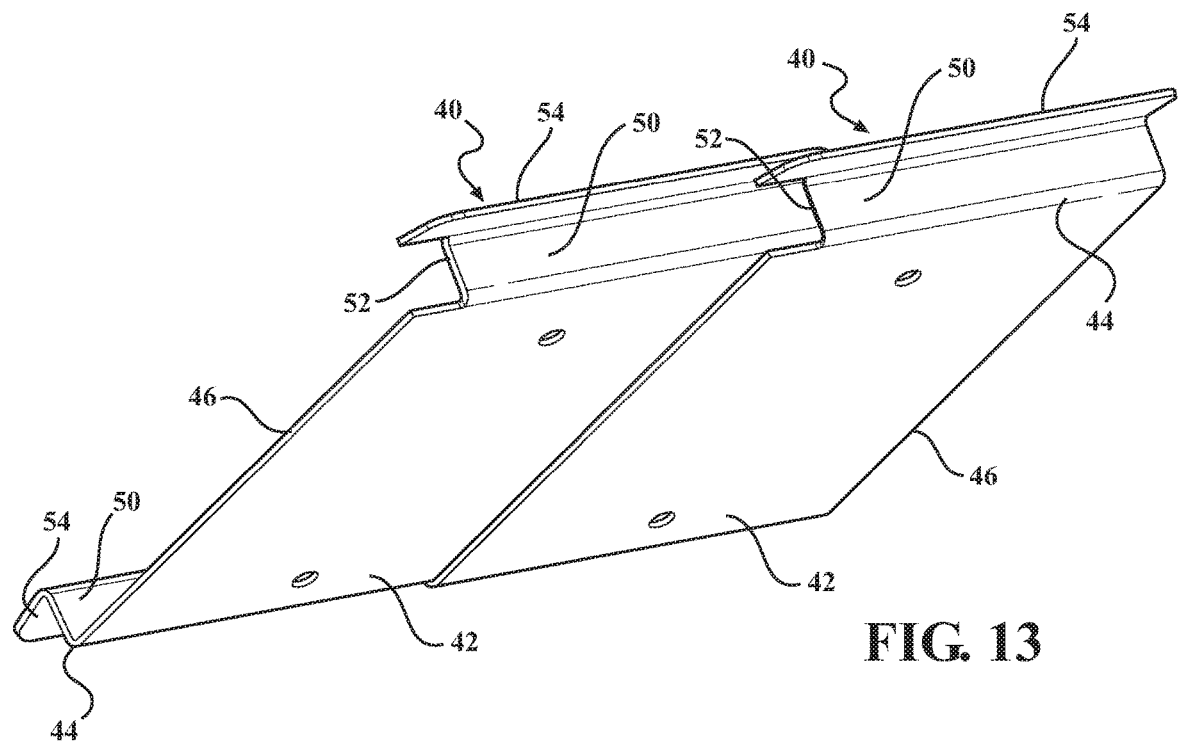
FIG. 13 is a rear perspective view showing two temporary protective covers in over-lapping relationship for installation into a double-gang junction box.
Figure 14:
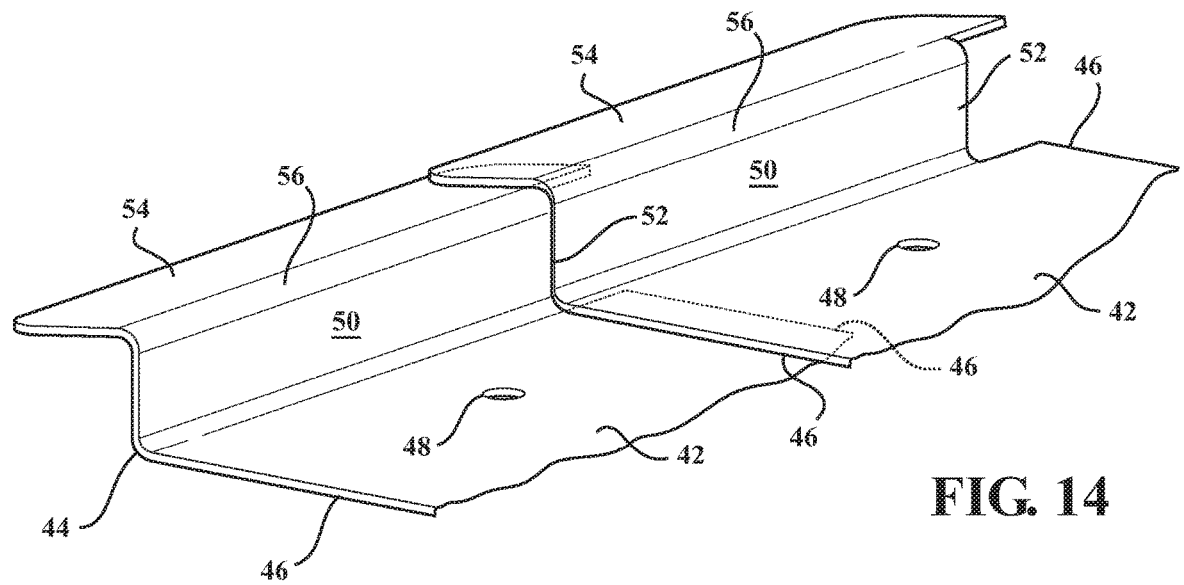
FIG. 14 is a fragmentary perspective view showing the overlapping region wherein the cleat of one cover is partially received into the notch of an under-lying cover.

FIGS. 13 and 14 offer different views of two overlapped covers 40 in the region of the notch 52. Because of the oversize nature of the covers 40, when overlapping two covers 40 the cleat 50 on the overlying cover 40 may tend to bind against the cleat 50 of the underlying cover 40. Careful inspection of these views will show how the notches 52 function to receive part of the cleat 50, and in particular the corner of its gripping edge 44, to reduce likelihood of binding. Regardless whether the included angle between body 42 and cleat 50 is acute or obtuse, the notches 52 will provide clearance for the cleats 50 of each cover 40 to independently bear upon its respective embossments 34 inside the junction box. I.e., an underlying cleat 50 will not impede the overlying cleat 50, resulting in both covers 40 being more-or-less equally and independently retained in the cavity 32 under spring tension, thus firmly holding the cover 40 in place. By forming a notch 52 having a width equal to the desired amount of overlap (X), the corner of the overlying cleat 50 will find clearance, thus making installation somewhat easier.

Finally, when it comes time to remove the temporary cover(s) 40 from the junction box 26, 28, if needed the removal hole 48 can be accessed with a small stem of bent wire or a tool as described above. Locating the removal hole 48 closer to one of the cleats 50 than to the other cleat 50 can make removal easier.

FIG. 15 illustrates an alternative embodiment of the protective cover 140. In this example, like or corresponding parts are identified with similar reference numbers offset by 100. Thus, the protective cover 140 corresponds to the protective cover 40 described in the preceding paragraphs. In the example of FIG. 15, the width of the protective cover 140 is expanded to fit a standard double-gang box 28. However, in this example the junction box is depicted in the exemplary form of a quadruple-gang box 128 having a mounting appliance in the form of a nailer bracket 138. And furthermore, the junction box 128 is represented as a metal style of the type typically intended for commercial applications. Of course, the principles of this invention are equally-applicable to all types of applications, including but not limited to residential and commercial and aerospace and marine and so forth.

One protective cover 140 is fitted into the right-side of the quadruple-gang box 128 with its cleats 150 wedged into place against the (obscured from view) embossments 134. In this installed position, stop tabs 154 overlay the embossments 134 and their respect screw holes 136 and the body 142 shields half of the cavity inside the junction box 128. The view shows a second protective cover 140 in an exploded position to describe the manner in which the remainder of the box cavity may be shielded in a similar manner to that described above. The covers 140 in this example are fitted with notches 152 that function similar to the function of notches 52 described above in connection with FIGS. 12-14.

Those of skill in the art will readily appreciate from the view of FIG. 15 that the protective covers 40, 140 can be made in various widths to better meet the needs of the end user. For example, one installer may prefer to use four small size protective covers 40 to shield the cavity of the quadruple-gang box in FIG. 15 rather than two of the larger covers 140 as shown. Or, the installer may prefer to use one double-size cover 140 and two small size protective covers 40. In another example of the in-the-field flexibility and adaptability enabled by this invention, an installer faced with a triple-gang junction box (not shown) could either choose to shield the box cavity with three small size protective covers 40, or one larger cover 140 and one small cover 40. And of course, the protective cover of this invention could be made even wider than the examples shown to fit a triple-gang junction box. Indeed, many options are available to suit the needs and practices of the market, with the accompanying illustrations and descriptions merely serving to highlight some of the potential variations and implementations.

Thus, the foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A temporary protective cover and junction box assembly comprising:
    a junction box having an opening to an internal cavity thereof, said opening having opposite top and bottom sides, an embossment formed in each of said top and bottom sides of said opening around a respective screw hole,
    a temporary cover adapted to press fit into said opening so as to occlude at least a portion of said cavity during wall covering and finishing operations and then to be removed prior to placing said junction box into active service, said temporary cover including a body having a generally rectangular shape defined by two generally parallel gripping edges and two generally parallel side edges,
    a pair of cleats, each said cleat extending directly and outwardly from a respective one of said gripping edges,
    a pair of stop tabs, each said stop tab extending directly and outwardly from a respective one of said cleats along an exterior interface and outwardly from the respective said gripping edge,
    said side edges being unencumbered by stiffening features, and
    said temporary cover disposed in said opening of said junction box with said body thereof flexed to seat said cleats against said opposing embossments with spring tension exerting radially-outward pressure.

2. The assembly of claim 1, wherein each said gripping edge has a generally constant included angle measured between the associated said cleat and said body, at least one of said included angles being a non-right angle.

3. The assembly of claim 2, wherein each said included angle is an obtuse angle between about 91-135 degrees.

4. The assembly of claim 1, wherein at least one said cleat has a notch therein contiguous with one of said side edges of said body.

5. The assembly of claim 4, wherein said body is fabricated from a rigid material having a generally constant body thickness, said at least one notch having a notch width being in the range of between about 5-16 times said body thickness.

6. The assembly of claim 1, wherein each said cleat has a notch therein contiguous with one of said side edges of said body, said notches being disposed in diagonal relation to said generally rectangular shape of said body.

7. The assembly of claim 6, wherein said body is fabricated from a rigid material having a generally constant body thickness, said notches each having a notch width being in the range of between about 5-16 times said body thickness.

8. The assembly of claim 1, wherein the distance between said gripping edges comprises a body length and the distance between said side edges comprises a body width, each said gripping edge having a cleat width less than said body width, each said exterior interface having a stop tab width equal to said body width and greater than the associated said cleat width.

9. The assembly of claim 1, wherein each said exterior interface has a generally constant take-off angle measured between the associated said stop tab and its respective said cleat, at least one said take-off angle being a non-right angle.

10. The assembly of claim 1, wherein each said exterior interface has a generally constant take-off angle measured between the associated said stop tab and its respective said cleat, each said take-off angle being an acute angle between about 45-89 degrees.

11. The assembly of claim 1, further including at least one removal hole disposed in and passing directly through said body, said at least one removal hole being disposed spatially closer to a selected one of said gripping edges.

12. A temporary protective cover and junction box assembly comprising:
    a junction box having an opening to an internal cavity thereof,
    a first temporary cover and a second temporary cover each adapted to press fit into said opening so as to occlude respective portions of said cavity, each of said first and second temporary covers including a body having a generally rectangular shape defined by two generally parallel gripping edges and two generally parallel side edges,
    each of said first and second temporary covers including a pair of cleats, each said cleat extending from a respective one of said gripping edges,
    each of said first and second temporary covers including a pair of stop tabs, each said stop tab extending from a respective one of said cleats along an exterior interface,
    wherein at least one said cleat of said first temporary cover having a notch therein contiguous with one of said side edges of said body, said notch extending inwardly from said side edge of said body,
    said first temporary cover disposed in said opening of said junction box with said cleats thereof pressed against said opening of said junction box, and
    said second temporary cover disposed in said opening of said junction box adjacent said first temporary cover with said cleats thereof pressed against said opening of said junction box, said second temporary cover partially overlapping said first temporary cover with said cleat of said second temporary cover being received into said notch of said first temporary cover.

13. The assembly of claim 12, wherein each said cleat of said first temporary cover has a notch therein contiguous with one of said side edges of said body, said notches being disposed in diagonal relation to said generally rectangular shape of said body.

14. The assembly of claim 13, wherein said body of each said first and second temporary covers is fabricated from a rigid material having a generally constant body thickness, said notches of said first temporary cover each having a notch width being in the range of between about 5-16 times said body thickness.

15. The assembly of claim 12, where each of said side edges of said first and second temporary covers are unencumbered by stiffening features.

16. The assembly of claim 12, wherein each said gripping edge of each of said first and second temporary covers has a generally constant included angle measured between the associated said cleat and said body, at least one of said included angles being a non-right angle.

17. The assembly of claim 12, wherein each said exterior interface of each of said first and second temporary covers has a generally constant take-off angle measured between the associated said stop tab and its respective said cleat, at least one said take-off angle being a non-right angle.

\* \* \* \* \*